United States Patent Office 3,634,506
Patented Jan. 11, 1972

3,634,506
PROCESS FOR THE MANUFACTURE OF
BIGUANIDE DERIVATIVES
Werner Bollag, Basel, Henri Ramuz, Birsfelden, and Hans Spiegelberg, Basel, Switzerland, assignors to Hoffmann-La Roche Inc., Nutley, N.J.
No Drawing. Filed May 19, 1969, Ser. No. 825,977
Claims priority, application Switzerland, June 21, 1968, 9,358/68
Int. Cl. C07f 5/02
U.S. Cl. 260—551 B
12 Claims

ABSTRACT OF THE DISCLOSURE

Novel boric acid complexes of biguanide derivatives and the process for the preparation thereof comprising the condensation of biguanide derivatives with boric acid, a boric acid derivative, or a boron halide in the presence of an inert organic solvent.

BACKGROUND OF THE INVENTION

The present invention relates to a process for the manufacture of boric acid complexes of biguanide derivatives. The process involves the reaction of biguanide derivatives of the general formula

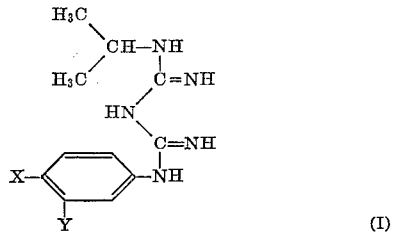

(I)

wherein X and Y are chlorine and/or bromine, with boric acid, a boric acid ester, a boric acid amide or with a boron halide.

The boric acid complexes obtained are novel compounds and as such are considered part of the invention. These novel boric acid complexes can be represented by the following formula

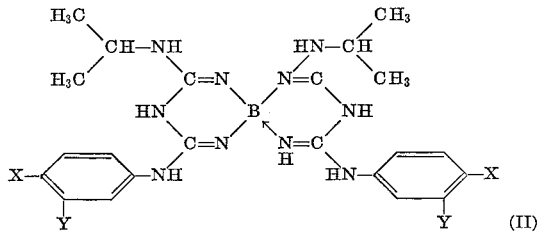

(II)

wherein X and Y are chlorine and/or bromine.

A preferred group of compounds falling within the scope of Formula II are those wherein X and Y are the same. Particularly preferred are those compounds of Formula II wherein both X and Y are chlorine.

As used herein, the term "boric acid esters" denotes esters of boric acid with straight-chain or branched aliphatic alcohols, especially those with 1 to 7 carbon atoms, such as for example, the methyl, ethyl, propyl, isopropyl, butyl, isobutyl, secondary butyl, tertiary butyl, pentyl esters etc., as well as aralkyl esters such as, for example, benzyl esters. Illustrative of these boric acid esters are triamylborate, tributylborate, triethylborate, and tribenzylborate.

The term "boron halides" denotes the chloride and bromide compounds; boron trichloride being particularly preferred.

The term "boric acid amides" denotes triaminoborane derivatives wherein each nitrogen component is disubstituted with lower alkyl and/or aralkyl groups, as, for example, tri-(N-dimethylamino)-borane, tri-(N-dibenzylamino)-borane, and tri-(N-diethylamino)-borane. In this case, it is understood that the term "lower alkyl" denotes a straight or branched carbon chain consisting of from 1–7 carbon atoms, while the term "lower aralkyl" denotes aralkyl groups with 1–7 carbon atoms in the alkyl portion and at most 10 carbon atoms in the aryl portion of the group.

The condensation of the compounds of Formula I with boric acid, with derivatives of boric acid or with a boron halide can be carried out in the presence of an inert organic solvent at room temperature or with heating. Depending upon the nature of the boron compound employed and the specific reaction conditions established, the reaction time can range anywhere from two hours to twenty-five hours.

In the case where boric acid is used, the reaction is conveniently carried out at elevated temperatures (preferably at the reflux temperature of the reaction mixture) in a solvent which distills azeotropically with water. Similarly, when boric acid esters or boric acid amides are used, the reaction is conveniently carried out with heating (preferably at the reflux temperature of the reaction mixture).

Where a boron halide is used, the reaction is conveniently carried out in the presence of any suitable acid binding agent soluble in the organic solvent utilized as the reaction medium. As preferred acid binding agents are the tertiary amines, with pyridine being the most preferred. A mixture of the solvent and the acid binding agent is cooled, preferably to about minus 20° C., and the boron halide is added. Subsequently the mixture is slowly heated to room temperature, then the compound of Formula I is added and the mixture is boiled at reflux temperature for a period of time determined by the requirements of the specific reaction materials employed.

For the purposes of this invention, inert organic solvents such as for example, aromatic hydrocarbons (e.g. benzene, toluene, xylene, etc.) can be used.

The compounds of Formula I which are used as the starting materials in the process of this invention are known compounds and can, for example, be manufactured by reacting an aniline which is substituted in the 3,4-position by chlorine and/or bromine with ω-cyano-ω'-isopropylguanidine.

The compounds of Formula II are cytostatically active substances. It has been found that these compounds inhibit the proliferation of the blood-forming tissue in cats and guinea pigs.

The leucopoietic mechanism in the guinea pig and cat reacts very sensitively to administration of the biguanide derivatives with parenteral application leading to a more rapid decrease in leucocyte formation than oral administration. The myelo- and the lymphopoietic functions are inhibited to about the same extent. The thrombopoiesis is not affected and the erythropoiesis is affected only slightly.

The compounds of Formula II obtained according to the process of this invention also show activity as folic acid antagonists. The action of these compounds on the hematopoietic function of the guinea pig is neutralized by corresponding amounts of Leucovorin (formyltetrahydrofolic acid). Thus, for example, 10 mg./kg. of the compound of Formula II wherein X and Y signify chlorine administered daily p.o. lead to a very rapid decrease of the leucocytes in the peripheral blood. If in each case a dosage of 20 mg./kg. of Leucovorin is injected i.p. 30 minutes before the peroral administration of the above boric acid complex, the leucocyte decrease can be completely avoided. In the case of parenteral application, 5 mg./kg. i.p. of the same boric acid complex lead to a fall in leucocytes. Leucovorin, in a dosage of 20 mg./kg. i.p., completely neutralized this effect.

The compounds formed by use of the inventive process also exhibit antimalarial activity. Thus the compound of Formula II wherein X and Y are chlorine showed, in a three day test on mice using daily dosages of 50 mg./kg., p.o., an activity against *Plasmodium berghei*.

The acute toxicity of the compound of Formula II wherein X and Y signify chlorine was tested in the mouse, rat and guinea pig. The following chart records the results of these tests.

| Species: | $LD_{50}$ mg./kg. (24 hr.) |
|---|---|
| Mouse: | |
| I.p. | 500 |
| P.o. | 240 |
| Rat: | |
| I.p. | >2000 |
| P.o. | 1400 |
| Guinea pig: | |
| I.p. | 1000 |
| P.o | 250 |

The results of the toxicity tests show that in the acute test in which results are recorded 24 hours after administration of the test compound, the compound of Formula II wherein X and Y are chlorine is only a slightly toxic substance.

The compounds of Formula II can be used as medicaments; for example, in the form of pharmaceutical preparations in which the novel biguanide derivative is combined with a pharmaceutically acceptable, organic or inorganic inert carrier material which is suitable for enteral or parenteral application. For the purpose of this invention, inert carriers such as, for example, water, gelatin, lactose, starches, magnesium stearate, talc, vegetable oils, gum arabic, polyalkyleneglycols, Vaseline, etc. may be used. The pharmaceutical preparations can be manufactured in solid form (e.g. as tablets, dragees, suppositories, capsules) or in liquid form (e.g. as solutions, suspensions or emulsions). They may be sterilized and/or contain additives such as preserving, stabilizing, wetting or emulsifying agents, salts for varying the osmotic pressure, or buffers. The pharmaceutical preparations containing the compounds of Formula II may also contain other therapeutically valuable substances.

Convenient pharmaceutical dosage forms contain about 20 mg. of the active material. The preparations can be administered enterally or parenterally, with an individual dosage range of about 0.2 to 2 mg./kg. body weight per day. In the case of oral application, the stated amounts of active substance may be administered several times daily. However, the aforementioned dosage ranges are exemplary and can be varied upwards or downwards according to the particular circumstances of each case.

EXAMPLE 1

110 g. of 3,4-dichloroaniline are mixed with 70 g. of ω-cyano-ω'-isopropylguanidine and, after the addition of 600 ml. of 2-ethoxyethanol, heated at 150° C. in the oil-bath for 12 hours. The $N^1$-(3,4-dichlorophenyl)-$N^5$-isopropylbiguanide precipitates in crystalline form on cooling the reaction mixture. It melts at 120–121° C. after recrystallization from aqueous ethanol.

EXAMPLE 2

In a 750 ml. round-bottom flask which carries a Soxhlet charged with calcium chloride, 144.1 g. of $N^1$-(3,4-dichlorophenyl)-$N^5$-isopropylbiguanide are boiled at reflux (bath-temperature 115° C.) for 7 hours with 7.73 g. of boric acid in 350 ml. of absolute benzene. The boric acid goes into solution after about 15 minutes and the boric acid complex crystallizes out after 3½–4 hours. The mixture is treated with an additional 3.865 g. of boric acid and boiled overnight at reflux. Finally, another 3.865 g. of boric acid are added and the mixture is boiled for 7 hours. The crystalline precipitate is filtered off and, after recrystallization from dimethylformamide and acetone, there is obtained the boric acid complex of $N^1$-(3,4-dichlorophenyl)-$N^5$-isopropylbiguanide.

UV: $\lambda_{max.}^{CH_3OH} = 270$ m$\mu$; $\epsilon = 64800$

In an analogous manner, from $N^1$-(3,4-dibromophenyl)-$N^5$-isopropylbiguanide and boric acid there can be manufactured the corresponding boric acid complex with a melting point of 230° C. The $N^1$-(3,4-dibromophenyl)-$N^5$-isopropylbiguanide used as the starting material can be obtained as described in Example 1.

EXAMPLE 3

11.52 g. of $N^1$-(3,4-dichlorophenyl)-$N^5$-isopropylbiguanide are dissolved in 80 ml. of absolute toluene and treated with 4.6 g. of tributyl borate. The clear solution is thereupon boiled at reflux for 15 hours. The resulting butanol is absorbed by anhydrous calcium chloride in a Soxhlet. After standing overnight, the precipitate is filtered off and there is obtained the boric acid complex UV = $\lambda_{max.}^{CH_3OH} = 270$ m$\mu$; $\epsilon = 64800$ The $N^1$-(3,4-dichlorophenyl)-$N^5$-isopropylbiguanide used as the starting material can be obtained as described in Example 1.

EXAMPLE 4

5.76 g. of $N^1$-(3,4-dichlorophenyl)-$N$-5-isopropylbiguanide are boiled at reflux with 50 ml. of absolute benzene and 1.43 g. of tris-N-dimethylaminoborane until no more dimethylamine is formed (about 3 hours). The solution is evaporated in vacuum and the residue recrystallized from methanol-acetone.

UV: $\lambda_{max.}^{CH_3OH} = 270$ m$\mu$; $\epsilon = 64800$

The $N^1$-(3,4-dichlorophenyl)-$N^5$-isopropylbiguanide used as the starting material can be obtained as in Example 1.

EXAMPLE 5

1.17 g. of boron trichloride are dissolved in 10 ml. of absolute toluene and added dropwise to a mixture of 10 ml. of pyridine and 40 ml. of absolute toluene cooled to −20° C. The clear solution is slowly warmed to room temperature, treated with 5.76 g. of $N^1$-(3,4-dichlorophenyl)-$N^5$-isopropylbiguanide and boiled at reflux for 2 hours. The resulting precipitate is taken up with acetic ester, washed with water, dried over sodium sulphate and evaporated in vacuum. The residue is recrystallized from alcohol-water.

UV: $\lambda_{max.}^{CH_3OH} = 270$ m$\mu$; $\epsilon = 64800$

EXAMPLE 6

Tablets of the following composition are manufactured:

| | Mg. |
|---|---|
| Boric acid complex in accordance with Example 2 | 20 |
| Avicel | 110 |
| Corn starch | 9 |
| Magnesium stearate | 1 |

EXAMPLE 7

Dragees of the following composition which are resistant to gastric juice are manufactured:

| | Mg. |
|---|---|
| Boric acid complex in accordance with Example 2 | 20 |
| Avicel | 129 |
| Cellulose acetate phthalate | 9.24 |
| Castor oil (hardened) | 4.76 |
| Sugar (crystalline) | 119.15 |
| Rice starch | 7 |
| Talc | 7 |
| Lactose | 2 |
| Gum arabic | 0.85 |
| Paraffin (solid and thinly liquid) | Traces |

EXAMPLE 8

An ampoule solution of the following composition is manufactured:

Boric acid complex in accordance with Example 2 mg.. 20
Propylene glycol _____ mg.. 881
Acetic acid (100%) _____ mg.. 2.4
Caustic soda (1–N) ad pH 8.0, quantum satis
Benzyl alcohol _____ mg.. 15
Distilled water, ad _____ ml.. 1

What is claimed is:

1. A compound of the formula

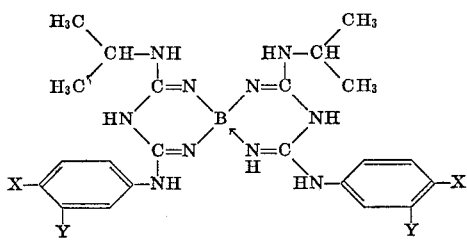

wherein X and Y are chlorine and/or bromine.

2. A compound as defined in claim 1 of the formula

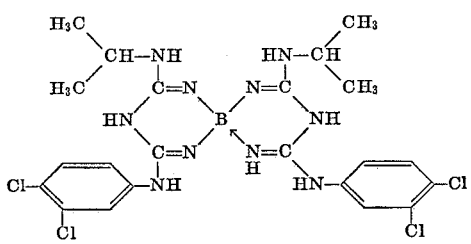

3. A compound as defined in claim 1 of the formula

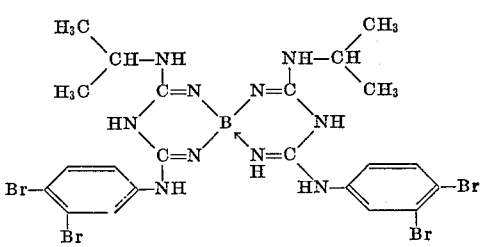

4. A compound as defined in claim 1 of the formula

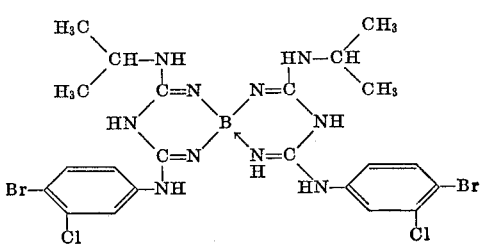

5. A compound as defined in claim 1 of the formula

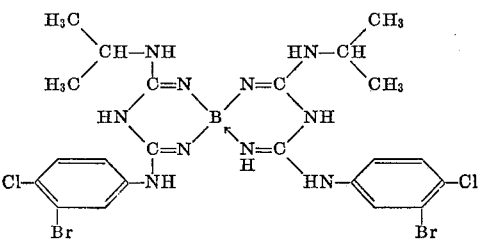

6. A process for the preparation of a compound of the formula

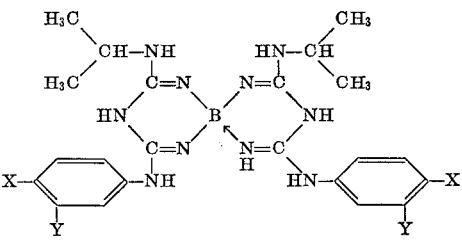

wherein X and Y are chlorine and/or bromine which comprises reacting a compound of the formula

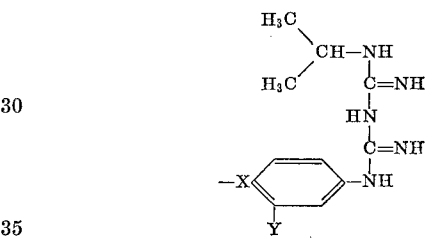

wherein X and Y are as above with boric acid, tributylborate, tri(N-dimethylamino)-borane or boron trichloride in the presence of an inert organic solvent.

7. The process of claim 6 wherein a compound of the Formula II is reacted with boric acid in the presence of an inert organic solvent which distills azeotropically with water.

8. The process of claim 7 wherein the inert organic solvent is benzene.

9. The process of claim 6 wherein a compound of Formula II is reacted with tributylborate in the presence of toluene.

10. The process of claim 6 wherein a compound of Formula II is reacted with tri-(N-dimethylamino)-borane in the presence of benzene.

11. The process of claim 6 wherein a compound of Formula II is reacted with boron trichloride in the presence of toluene and an acid binding agent which is soluble in the toluene.

12. The process of claim 11 wherein the acid binding agent is pyridine.

References Cited
FOREIGN PATENTS 1,236,516   3/1967   Germany _____ 260—551

HENRY R. JILES, Primary Examiner

H. I. MOATZ, Assistant Examiner

U.S. Cl. X.R.

424—185